United States Patent [19]

Koketsu

[11] Patent Number: 5,467,078
[45] Date of Patent: Nov. 14, 1995

[54] SYSTEM AND METHOD FOR COMMUNICATING DATA BETWEEN PLURAL AIR CONDITIONING MACHINES FOR CONTROLLING THE MACHINES AND DISPLAYING THEIR STATUS

[75] Inventor: Tadaaki Koketsu, Gifu, Japan

[73] Assignee: Kabushiki Kaisha Toshiba, Kawasaki, Japan

[21] Appl. No.: 45,869

[22] Filed: Apr. 15, 1993

[30] Foreign Application Priority Data

Apr. 15, 1992 [JP] Japan ..................................... 4-095213

[51] Int. Cl.⁶ .................................................. G05B 23/02
[52] U.S. Cl. ................................ 340/825.06; 340/825.22
[58] Field of Search .................... 340/825.06, 825.07, 340/825.22; 62/175; 236/51

[56] References Cited

U.S. PATENT DOCUMENTS

| | | | |
|---|---|---|---|
| 4,287,939 | 9/1981 | Pohl et al. | 340/825.22 |
| 4,419,667 | 12/1983 | Gurr et al. | 340/825.06 |
| 4,703,306 | 10/1987 | Barritt | 340/825.22 |
| 4,835,706 | 5/1989 | Asahi | 340/825.06 |
| 5,008,662 | 4/1991 | Tokizane et al. | 340/825.07 |
| 5,132,679 | 7/1992 | Kubo et al. | 340/825.22 |

FOREIGN PATENT DOCUMENTS

| | | |
|---|---|---|
| 0146915 | 7/1985 | European Pat. Off. . |
| 0157882 | 10/1985 | European Pat. Off. . |
| 0254352 | 1/1988 | European Pat. Off. . |
| 2095428 | 9/1982 | United Kingdom . |
| 2096799 | 10/1992 | United Kingdom . |

Primary Examiner—Donald J. Yusko
Assistant Examiner—Gregg V. Miller
Attorney, Agent, or Firm—Cushman, Darby & Cushman

[57] ABSTRACT

A communicating system has at least two air conditioning machines which are connected to a primary interface and a secondary interface, respectively. The primary interface is connected to a primary remote controller having a display. The secondary interface is connected to a secondary remote controller having a display and the primary interface. When the state of all air conditioning machines is to be changed by a command from the primary remote controller, firstly all displays are caused to display the now run mode of the air conditioning machines substantially at the same time. After that, the operating states of the air conditioning machines are a predetermined interval.

15 Claims, 6 Drawing Sheets

FIG. 4

| START CODE | SELF ADDRESS | RELATIVE ADDRESS | COMMAND CODE | D1 | D2 | D3 | D4 | D5 | D6 | CHECK SUM | ACK NAK | END CODE |

SYSTEM AND METHOD FOR COMMUNICATING DATA BETWEEN PLURAL AIR CONDITIONING MACHINES FOR CONTROLLING THE MACHINES AND DISPLAYING THEIR STATUS

BACKGROUND OF THE INVENTION

The present invention relates to a data communicating system for controlling plural air conditioning machines.

In a prior communicating system, in which plural air conditioning machines installed in factories and/or offices are controlled by a remote controller, an interface is provided corresponding to each air conditioning machine. An output terminal of a primary interface is connected to input terminals of secondary interfaces by a common cable. The primary interface is connected to a primary remote controller. One or more of the secondary interfaces are connected to one or more secondary remote controllers, respectively.

In addition, in the prior art, the primary remote controller communicates on a routine periodic basis with the primary interface. The primary interface determines if a command from the primary remote controller for the run mode of the air conditioning machines has changed. When the command has changed, the primary interface communicates the changed command to the secondary interfaces corresponding to the other air conditioning machines, and the run mode of the air conditioning machines is changed.

Moreover, the primary interface also routinely communicates with the secondary interfaces. A signal, which indicates the presence or absence of a malfunction in an air conditioning machine, is transmitted to the primary interface from the corresponding secondary interface. A display on each primary and secondary remote controller shows the run mode of each air conditioning machine and the presence or absence of a malfunction.

If all of the air conditioning machines are in a shutdown mode and it is then desired to start them, all of the air conditioning machines cannot be started simultaneously to avoid an excessive starting current. Therefore, in the prior art, in order to prevent an excessive starting current, the primary interface transmits starting command signals to the secondary interfaces and indicating signals (to cause the displays of all the primary remote controller and secondary remote controllers to indicate the changed status) in a staggered manner separated by a fixed time interval, for example, 4 seconds.

Problems in the prior art construction are as follows.

Firstly, since the starting command signal and the indicating signal are outputted together, when the air conditioning machines are started from the shutdown mode, the display of the secondary remote controller, corresponding to a last air conditioning machine which is started, does not show the run mode until after all the air conditioning machines are started.

Therefore, a certain period of time is required until all the displays show the run mode.

Secondly, since routine communications continuously pass between the primary interface and each of the secondary interfaces, the probability of a communication malfunction becomes greater.

SUMMARY OF THE INVENTION

It is an object of providing a communication system in which the run mode of plural air conditioning machines can be shown promptly.

It is another object of providing a communicating system in which the probability of generation of communication malfunction between the primary interface and secondary interfaces is minimized.

In order to achieve the above objects, in the present invention at least two air conditioning machines are interconnected and controlled over a communication system. Means are provided for outputting an operating signal for the air conditioning machines. The operating signal includes an indicating signal and an actuating signal. At least one display is responsive to the outputted indicating signal to display the operation status of each air conditioning machine. More specifically, the information shown on two or more displays may be updated simultaneously based on a single broadcast signal.

A controller is coupled to each air conditioning machine and to the outputting means. Each controller is responsive to the outputted operating signal for controlling the operation of the air conditioning machines on the basis of the outputted actuating signal, after the operation of all air conditioning machines is displayed substantially at the same time. The controller actuates the air conditioning machines sequentially with a predetermined interval inbetween actuations.

The present invention also contemplates a corresponding method.

BRIEF DESCRIPTION OF THE DRAWINGS

These and other objects and advantages of this invention will become apparent and more readily appreciated from the following detailed description of the presently preferred exemplary embodiment, taken in conjunction with the accompanying drawings of which:

FIG. 4 illustrates an operating signal generated by a remote controller;

DETAILED DESCRIPTION OF THE PRESENTLY PREFERRED EXEMPLARY EMBODIMENT

Figure 1:
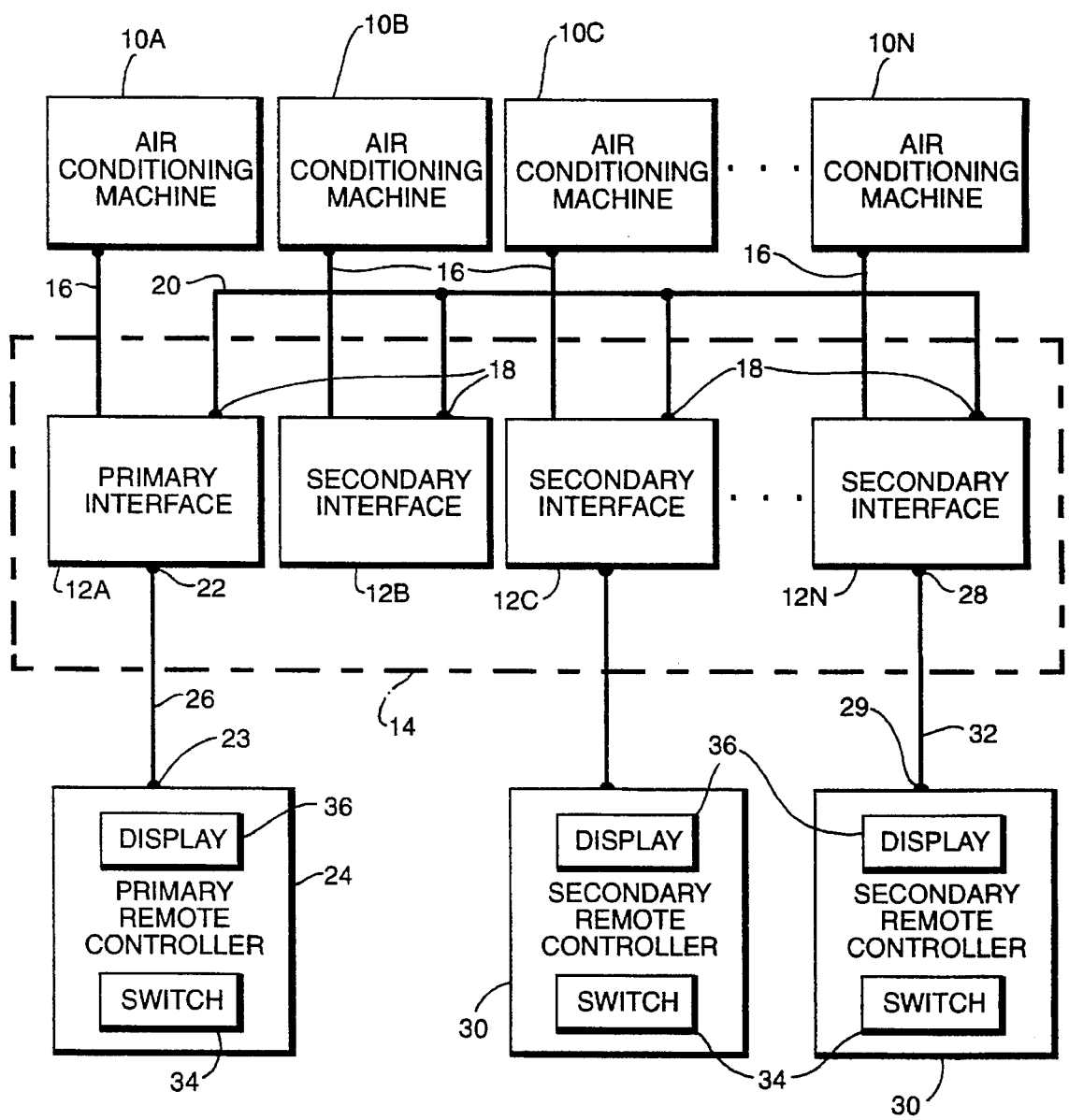
FIG. 1 is a block diagram of a communication system according to the present invention.

An embodiment of the present invention will now be described with reference to FIG. 1, in which the construction of the unit is outlined. Plural air conditioning machines 10A to 10N are respectively connected to interfaces 12A to 12N. Interfaces 12A to 12N collectively act as controlling means 14 and connection is made from each to an independent air conditioning unit by respective cables 16. One of the interfaces, interface 12A, is selected as the primary interface and the remaining interfaces 12B to 12N are set as secondary interfaces. Each first input/output terminal 18 of primary interface 12A and secondary interfaces 12B to 12N are connected to each other by an interface communicating cable 20. A second input/output terminal 22 of primary interface 12A is connected to an input/output terminal 23 of an outputting means such as a primary remote controller 24 by a remote controller communicating cable 26. A second input/output terminal 28 of secondary interface 12N is connected to an input/output terminal 29 of a secondary remote controller 30 by a second remote controller communicating cable 32. Switches 34 which are operated by an operator are located on primary remote controller 24 and each secondary remote controller 30. An operating signal for air conditioning machines 10A to 10N is generated by switch 34. The operating signal includes an indicating signal and an actuating signal. Displays 36 are located on remote controllers 24 and 30, respectively. Each display 36 shows a run mode of the air conditioning machines 10A to 10N on the basis of the indicating signal, and a malfunction of any air conditioning machine and malfunction of any communication between interfaces 12A to 12N.

Figure 2:
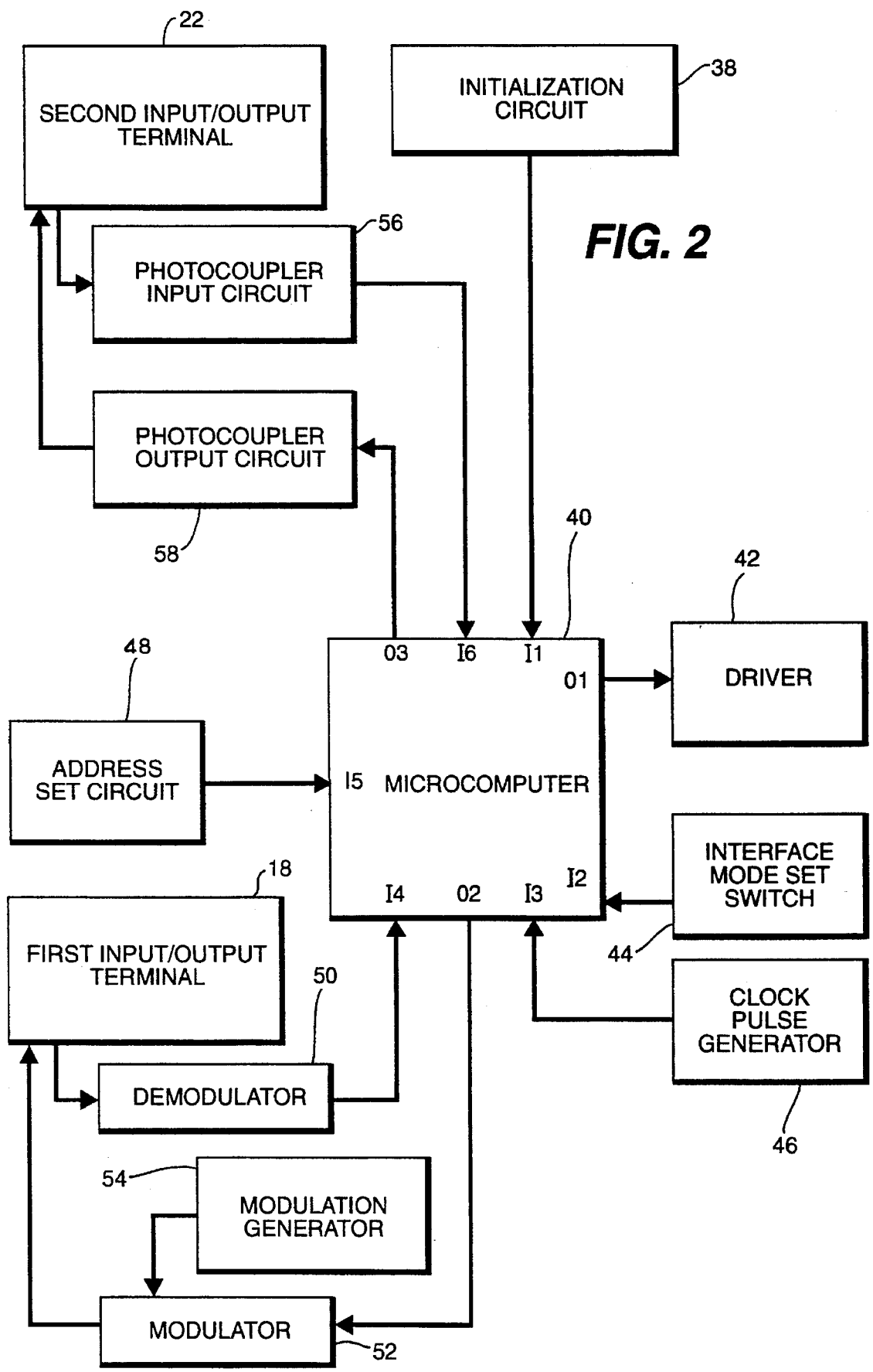
FIG. 2 is a block diagram of an interface.

Next, the construction of the primary and secondary interfaces 12A to 12N will be described with reference to FIG. 2. The primary interface 12A has the same construction as secondary interfaces from 12B to 12N, so only the construction of the primary interface 12A will be described. A initialization circuit 38 is connected to a microcomputer 40 via an input port I1. An output port O1 of microcomputer 40 is connected to a driver 42, which is connected to air conditioning machine 10A by cable 16. An input port I2 of the microcomputer 40 is connected to an interface mode set switch 44, by which interface 12A is set as the primary interface or a secondary interface. That is, in the present embodiment, the interface 12A is selectively set as the primary interface with switch 44 and interfaces 12B to 12N are selectively set as secondary interfaces with their respective switches 44.

A clock pulse generator 46 is connected to an input port I3 of microcomputer 40. An input port I5 is connected to an address set circuit 48, which can set a specific address of interface 12, respectively. First input/output terminal 18 is connected to an input port I4 of microcomputer 40 through a demodulator 50. First input/output terminal 18 is also connected to an output port O2 of microcomputer 40 through a modulator 52. The modulator 52 is connected to a modulation generator 54. In this case, first input/output terminal 18 is connected to interface communicating cable 20.

Second input/output terminal 22 is connected to an input port I6 of microcomputer 40 through a photocoupler input circuit 56, and is also connected to an output port O3 of the microcomputer 40 through a photocoupler output circuit 58. In this case, second input/output terminal 22 and a second input/output terminal 28 of secondary interface 12N are connected to the remote controller communicating cables 26 and 32, respectively, in order to connect interfaces 12 and remote controllers 24 and 30.

Figure 3:
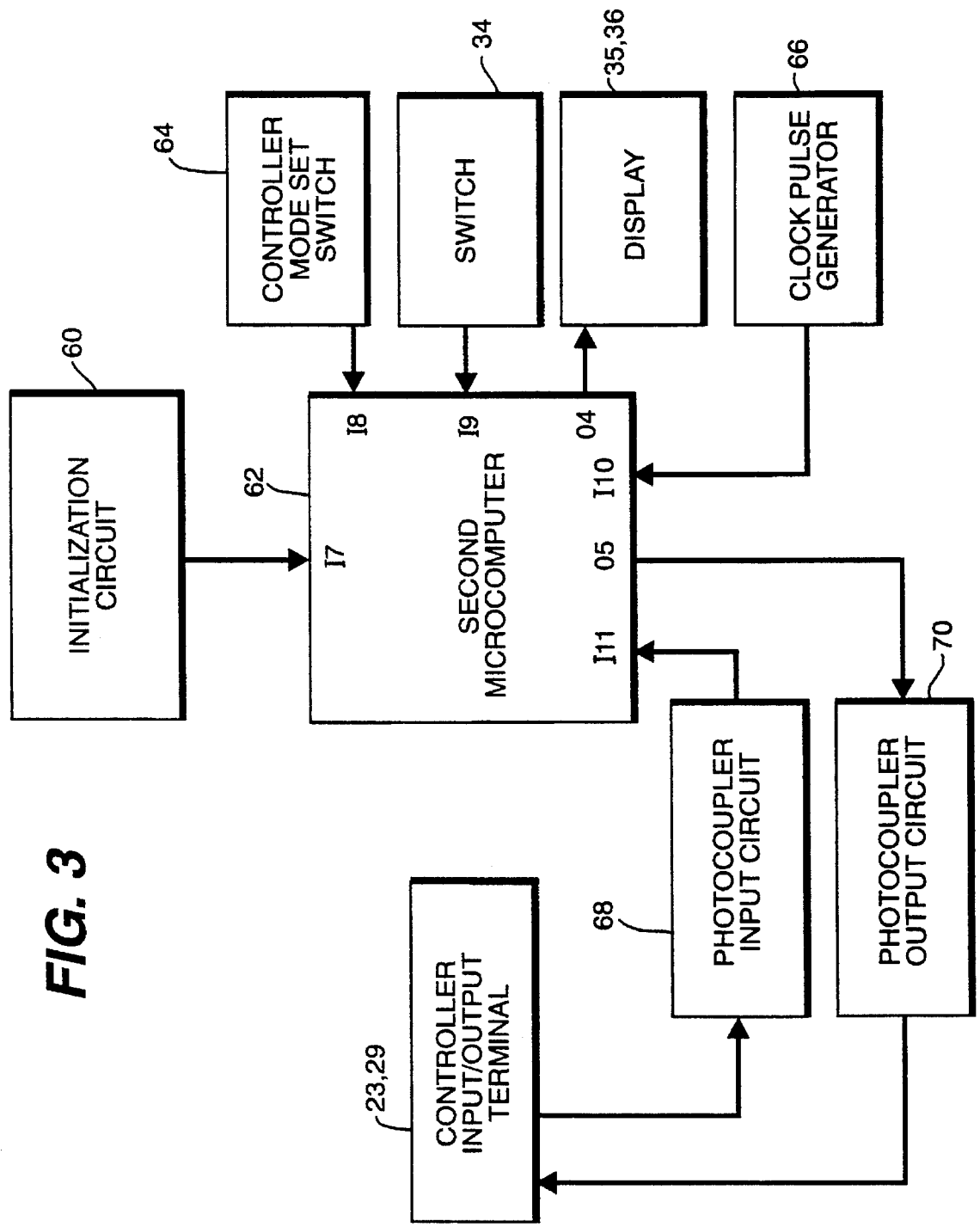
FIG. 3 is a block diagram of a remote controller.

FIG. 3 illustrates the construction of primary remote controller 24 and secondary remote controller 30. Primary remote controller 24 has the same construction as secondary remote controller 30. An initialization circuit 60 is connected to a second microcomputer 62 for the remote controller via an input port I7. An input port I8 of microcomputer 62 is connected to a controller mode set switch 64 by which a mode of the remote controller is set in a central mode or an individual mode. If both primary remote controller 24 and secondary remote controller 30 are set in the central mode, primary remote controller 24 can control both primary interface 12A and all secondary interfaces 12B to 12N, whether or not they are connected to one of secondary remote controllers 30. That is, when in central mode primary remote controller 24 can control all the air conditioning machines.

On the other hand, if one or more of secondary remote controllers 30 is set in the individual mode, primary remote controller 24 cannot control those secondary interfaces which are connected to secondary remote controllers 30 set in the individual mode. When in the individual mode, those secondary interfaces 12N can only be controlled by secondary remote controllers 30 to which they are connected. That is, when in individual mode primary remote controller 24 can control air conditioning machines 10A and 10B which are connected to primary interface 12A and secondary interface 12B, neither of those machines being connected to a secondary remote controller 30. Switch 34 and a clock pulse generator 66 are connected to second microcomputer 62 via input ports I9 and I10, respectively. An output port O4 of second microcomputer 62 is connected to display 35, 36 which displays the run mode of air conditioning machines 10A to 10N. The run mode may indicate, for example, shut down, running low, running medium, running high and the presence or absence of a malfunction. Controller input/output terminal 23, 29 is connected to an input port I11 of microcomputer 62 through a photocoupler input circuit 68, and is connected to an output port O5 of microcomputer 62 through a photocoupler output circuit 70. In this case, the controller input/output terminal 23 and 29 is connected to the remote controller communicating cable 26 and 32 respectively.

Figure 5:
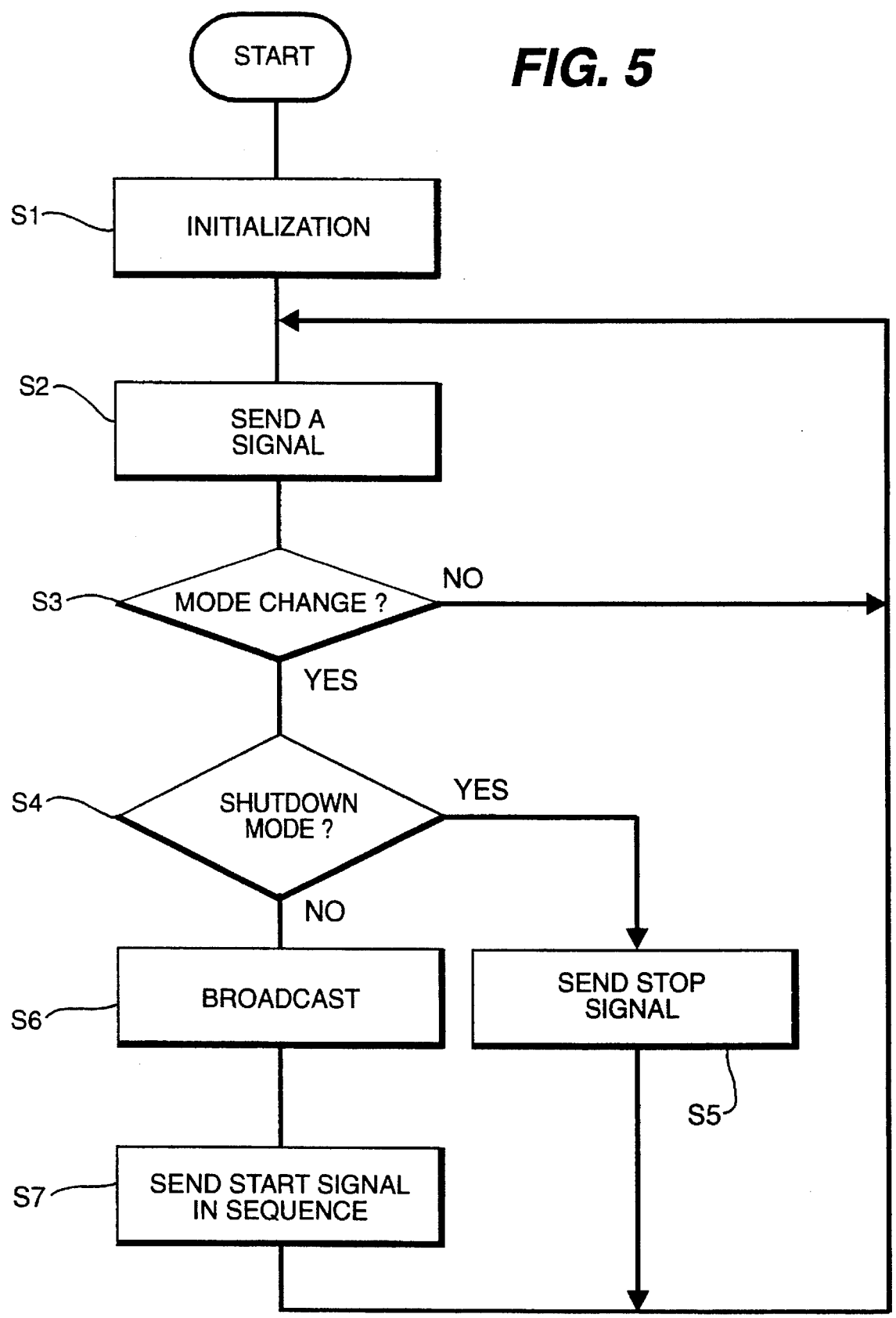
FIG. 5 is a flow chart illustrating the operation of a primary interface.
Figure 6:
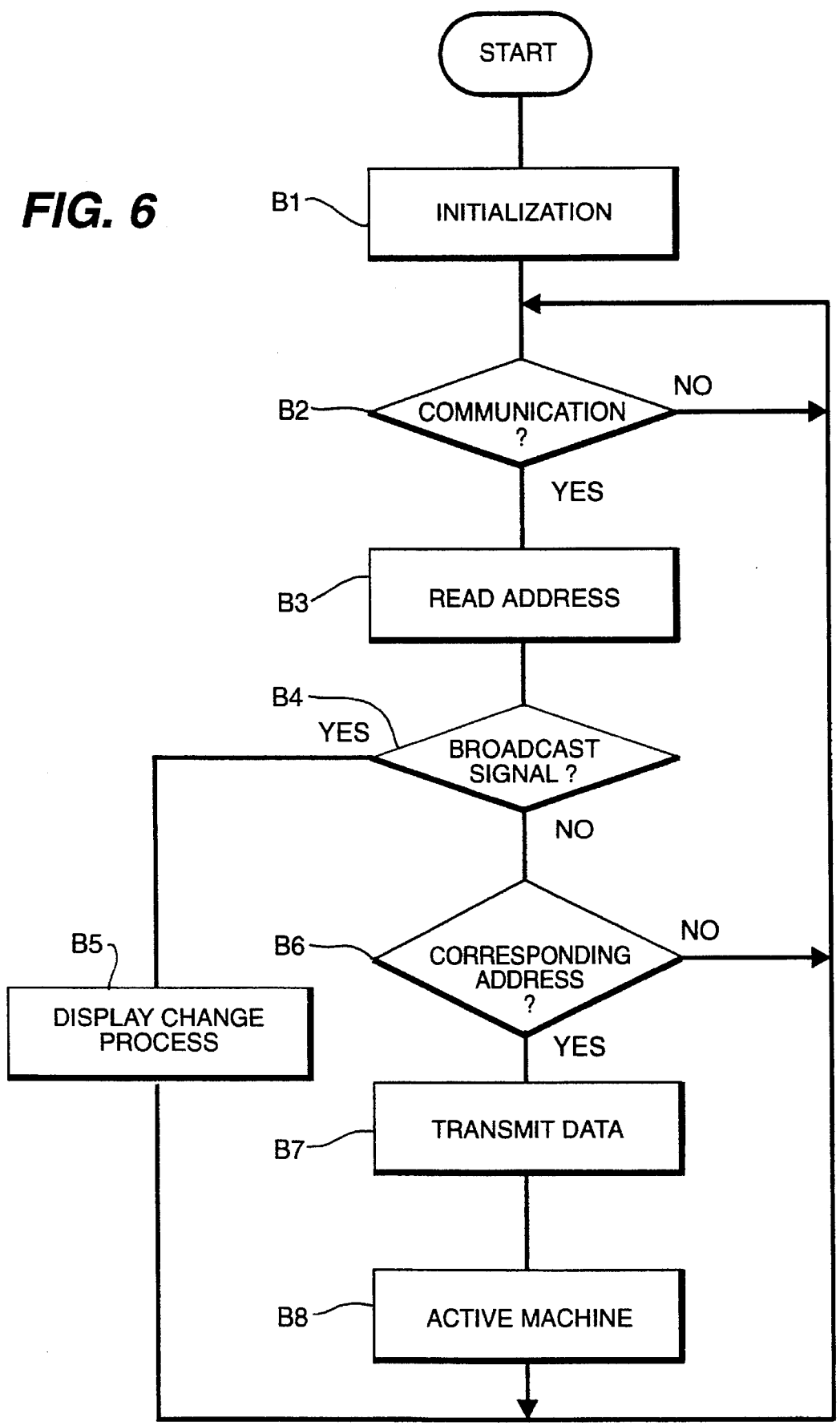
FIG. 6 is a flow chart illustrating the operation of a secondary interface.

With reference to FIG. 5 and FIG. 6, operation of the present embodiment will be described. As mentioned above, interface 12A is set as the primary interface by interface mode set switch 44. Interfaces 12B to 12N are set as secondary interfaces by their interface mode set switches 44. Primary remote controller 24 and secondary remote controller 30 are set in the central mode by controller mode set switch 64. In this case, FIG. 5 shows a control flow chart of primary interface 12A, and FIG. 6 shows a control flow chart of secondary interfaces 12B to 12N. As shown in FIG. 5, when electric power is supplied, microcomputer 40 of primary interface 12A performs an initialization (step S1).

Then, microcomputer 40 of primary interface 12A sends a communication demand signal to second microcomputer 62 of primary remote controller 24 (step S2). If the run mode of air conditioning machines 10A to 10N, as set by switch 34 need not be changed, second microcomputer 62 of primary remote controller 24 determines "NO" in step S3. Then processing returns to step S2. That is, there is a routine communication between microcomputer 40 of primary interface 12A and second microcomputer 62 of primary remote controller 24.

In the above routine communication, when microcomputer 40 determines "yes" in step S3 processing advances to step S4.

In step S4, microcomputer 40 determines whether a signal, which is sent to microcomputer 40 from input port I6 through second input/output terminal 22, indicates the shutdown mode or not. If the signal indicates the shutdown mode, microcomputer 40 outputs a signal to air conditioning machines 10A to 10N from output port O1 through driver 42 by cable 16, with a 0.5 second interval in the sequence (step S5). Then, flow returns back to step S2.

In step S4, when microcomputer 40 determines "YES", at step S5, a stop signal is sent and air conditioners remain in their previous state. Operation then returns to step S2. Otherwise, when "NO", a broadcast step is performed (step S6) A broadcast is a communication that is intended for all secondary interfaces 12B–12N. This is to be distinguished from a communication intended for a single interface. The situation described here is when air conditioning machines 10A to 10N are in shutdown mode and are to be started. That is, when air conditioning machines 10A to 10N are set in a start mode by switch 34 of primary remote controller 24, microcomputer 40 of primary interface 12A sets a specific address, for example, "0000" as the relative position that a broadcast is intended of a data communication signal (See FIG. 4).

The microcomputer 40 outputs the data communication signal from the output port 02 through first input/output terminal 18 to secondary interfaces 12B to 12N by interface communicating cable 20. The data communication signal is inputted to input port 14 of microcomputer 40 of secondary interfaces 12B to 12N. Data D1 to D6, as shown in FIG. 4, indicates the run mode of air conditioning machines 10A to 10N.

After step S6, microcomputer 40 of primary interface 12A sequentially sends data communication signals with addresses corresponding to different of primary and secondary interfaces 12A to 12N and run mode commands for air conditioning machines 10A to 10N at a predetermined interval, for example, 4 seconds (step 57).

With reference to FIG. 6, when electric power is supplied to microcomputers 40 of secondary interfaces 12B to 12N, firstly, microcomputer 40 performs an initialization (step B1). Then, the flow progresses to step B2, where microcomputers 40 of secondary interfaces 12B to 12N determine whether a data communication signal from microcomputer 40 of primary interface 12A has been received. If not, the flow is held at step B2. That is, until a data communication signal is received, secondary interfaces 12B to 12N are in a waiting mode.

When microcomputers 40 of secondary interfaces 12B to 12N receive a data communication signal from microcomputer 40 of primary interface 12A, the microcomputers 40 of secondary interfaces 12B to 12N read the relative address of data communication signal (step B3). Microcomputers 40 of secondary interfaces 12B to 12N determine whether the signal is a broadcast signal, that is, whether the relative address is "0000" or not (step B4). If the signal is a broadcast, the flow progresses to the display change process (step B5).

In the step B5, when primary and secondary remote controllers 24 and 30 are connected to interfaces 12A to 12N, displays 36 on primary and secondary remote controllers 24 and 30 display a run mode based on the data from D1 to D6 in the broadcast signal from primary interface 12A.

That is, indicating signals are sent with the relative address of "0000" and mode data broadcast D1 to D6. Actuating signals include the relative address of each interface 12A and 12N and mode data located at D1 to D6.

Consequently, the relative address indicates whether the operating signal is an indicating signal or an actuating signal.

After displays 36 display the updated run mode, secondary interfaces 12B to 12N receive actuating signals by which air conditioning machines 10A to 10N are performed. When microcomputers 40 of secondary interfaces from 12B to 12N progress to step B6, the microcomputer determines whether the relative address of the data from primary interface 12A corresponds to its own address. If not, flow returns back to step B2. If so, that microcomputer 40 reads the actuating signal by which the air conditioning machine 10 that it controls is actuated. The addressed microcomputer 40 transmits data indicating that it received the actuating signal and data indicating the presence or absence of a malfunction of itself or the air conditioning machine that it controls (step B7).

Then, the addressed microcomputer 40 actuates the air conditioning machine that it controls based on the actuating signal (step B8).

The address of each microcomputer 40 of interface 12 is set by address set circuit 48. Of course, "0000" is not a valid address.

When interface 12N is set in a primary interface by the interface mode set switch 44, and the interfaces 12A and 12B are set in a secondary interface, the interface 12N performs in the FIGURE 5 flow chart as the primary interfaces 12A and 12B perform in the FIG. 6 flow chart as the secondary interfaces.

When any of secondary remote controllers 30 are set in an individual mode by controller mode set switch 64, only that secondary remote controller 30 can control the air conditioning machine which is connected to the corresponding secondary interface.

When the run mode of air conditioning machines 10A to 10N, which correspond to interfaces 12A to 12N, is changed by primary remote controller 24, firstly displays 36 of primary and secondary remote controllers 24 and 30 display the run mode substantially at the same time. After that, the air conditioning machines are actuated sequential at intervals of, for example, 4 seconds.

Therefore, displays 36 are updated almost immediately after the run mode has been changed.

Moreover, primary interface 12A communicates with secondary interfaces 12B to 12N only when the run mode of air conditioning machines 10A to 10N is changed by primary remote controller 24. Therefore, the number of communications between primary interface 12A and secondary interfaces 12B to 12N is minimized, and the number of communication malfunctions can be minimized.

In the above embodiment, although interface 12A or 12B can be selectably set as a primary or secondary interface by the interface mode set switch 44, the setting may be fixed at the time the interfaces are manufactured.

Although only a single preferred embodiment has been described in detail above, those skilled in the art will certainly understand that many modifications are possible in the preferred embodiment without departing from the teachings thereof.

All such modifications are intended to be encompassed within the following claims.

What is claimed is:

1. A communicating system, comprising:

at least two air conditioning machines;

means for outputting an operating signal, the operating signal including an outputted indicating signal and an outputted actuating signal;

multiple display means, responsive to the outputted indicating signal, for displaying an operation of the air conditioning machines; and means, responsive to the outputted operating signal and coupled to each air conditioning machine and to the outputting means, for controlling the operation of the air conditioning machines on the basis of the outputted actuating signal, the controlling means changing an operating state of the air conditioning machines in sequence at a predetermined interval as each display means displays the operation of all air conditioning machines substantially at the same time.

2. A communicating system according to claim 1, wherein the controlling means includes at least two interconnected interfaces, each interface also being coupled to one of the air conditioning machines, respectively.

3. A communicating system according to claim 2, wherein one of the interfaces is a primary interface, the primary interface being connected to the outputting means.

4. A communicating system according to claim 3, further comprising means for determining when the signal being output by the outputting means is different from a previous signal output by the outputting means, wherein the primary interface regularly communicates with the outputting means, the primary interface communicating with the other interfaces only when the signal from the outputting means is not the same as the previously output signal.

5. A communicating system according to claim 2, wherein one of the interfaces is a primary interface, and the remainder are secondary interfaces.

6. A communicating system according to claim 5, wherein the outputting means includes a primary remote controller and a secondary remote controller, the primary remote controller being connected to the primary interface, and the secondary remote controller being connected to one of the secondary interfaces.

7. A communicating system according to claim 6, wherein display means are located on the primary and the secondary remote controller, respectively.

8. A communicating system according to claim 6, wherein the primary remote controller and the secondary remote controller each include a controller mode set switch for selecting a central mode or an individual mode, when the primary remote controller and the secondary remote controller are set in the control mode, the primary interface controlling the air conditioning machines connected to the primary remote controller and the secondary remote controller through the primary and the secondary interfaces.

9. A communicating system according to claim 2, wherein each interface has an interface mode set switch for determining whether each interface is a primary or a secondary interface.

10. A communicating system according to claim 9, wherein only one of the interfaces can be set as the primary interface, and the remainder are set as secondary interfaces.

11. A communicating system according to claim 1, wherein the outputting means includes a remote controller.

12. A communicating system according to claim 11, wherein the remote controller includes a switch actuated by an operator, the operating signal being determined by the actuated switch.

13. A communicating system according to claim 11, wherein the display means is located on the remote controller.

14. A communicating system, comprising:

a) at least two air conditioning machines;

b) a primary remote controller having a switch and a display, the primary remote controller outputting an operation signal for at least one of the air conditioning machines according to the switch, the operation signal including an indicating signal and an actuating signal, where the display, being responsive to the outputted indicating signal, displays the operation mode of the air conditioning machines;

c) a primary interface, responsive to the outputted operating signal and coupled to one of the air conditioning machines and to the primary remote controller, the primary interface controlling the operation of the one air conditioning machine on the basis of the outputted actuating signal, and also controlling the display;

d) at least one secondary interface, coupled to the primary interface and to each of the other air conditioning machines to control the other air conditioning machines; and e) a secondary remote controller having a display and a controller mode set switch which determines whether the secondary remote controller is in a central mode or an individual mode, the secondary remote controller being coupled to one secondary interface such that when the controller mode is set in the central mode, the one secondary interface is controlled by the primary interface, and when the controller mode is set in the individual mode, the one secondary interface is controlled by the secondary remote controller, the primary interface outputting the indicating signal to each display substantially at the same time so that each display is updated substantially at the same time when in central mode, and as the displays are updated, outputting the actuating signal to each secondary interface in sequence at a predetermined interval.

15. A method of controlling at least two air conditioning machines, comprising the steps of:

outputting an operating signal for the air conditioning machines, the operating signal including an indicating signal and an actuating signal, displaying each operation of the air conditioning machines substantially at the same time on multiple displays; and after the displaying step, outputting the actuating signal to the air conditioning machines in sequence at a predetermined interval.

\* \* \* \* \*